United States Patent
Brykov et al.

(10) Patent No.: US 6,776,836 B2
(45) Date of Patent: Aug. 17, 2004

(54) ADHESIVE COMPOSITION

(75) Inventors: Alexej Sergeovleh Brykov, St. Petersburg (RU); Valentine Issaxovish Kornfev, St. Petersburg (RU)

(73) Assignee: R-Amtech International, Inc., Bellevue, WA (US)

( * ) Notice: Subject to any disclaimer, the term of this patent is extended or adjusted under 35 U.S.C. 154(b) by 0 days.

(21) Appl. No.: 10/372,928

(22) Filed: Feb. 26, 2003

(65) Prior Publication Data

US 2003/0192458 A1 Oct. 16, 2003

(30) Foreign Application Priority Data

Apr. 12, 2002 (RU) ........................................ 2002109451

(51) Int. Cl.⁷ .............................................. C04B 28/26
(52) U.S. Cl. ................................... 106/626; 106/287.1
(58) Field of Search ............................ 106/287.1; 1/626

(56) References Cited

U.S. PATENT DOCUMENTS 3,721,574 A 3/1973 Schneider et al.
4,361,659 A * 11/1982 Friedemann et al. ........ 523/220

FOREIGN PATENT DOCUMENTS

EP 0 041 212 A1 5/1981

* cited by examiner

Primary Examiner—Elizabeth D. Wood
(74) Attorney, Agent, or Firm—Rothwell, Figg, Ernst & Manbeck, PC

(57) ABSTRACT

The invention relates to adhesives manufacturing. These adhesives are used in household and industry for adhering various materials (concrete, ceramics, different coatings, etc) exploited under temperatures +50° C. to −20° C and under elevated humidity. The adhesive composition represents the product of interaction between potassium silicate aqueous solution (density of 1.3 to 1.37 g/cm³, molar ratio $SiO_2/K_2O$ of 3.4 to 3.7), anhydrous lithium hydroxide mixed with di- or trihydric alcohol, vollastonite (particle size of 150 µm and smaller, length to diameter ratio 5–3:1), talc (particle size of 10 to 20 µm mainly) and inorganic pigment. The adhesive composition is prepared by a given consecutive mixture of components. The adhesive composition has enhanced activity (storage stability) and water resistance. It also has improved strength of adhesion junction while adhering various materials; it is non-toxic and pollution-free.

7 Claims, No Drawings

_(1)_
ADHESIVE COMPOSITION

FIELD OF THE INVENTION

The invention relates to adhesive compositions on the basis of inorganic binder (water glass) and may be used in industry and household for adhering ceramic or natural stone tiles or other coatings to concrete and plastered wall, ceiling and floor surfaces, for inner and outer finishing of residential and public buildings.

BACKGROUND OF THE INVENTION

RU 2131447, Jun. 10, 1999, reports of adhesive composition comprising from 38 to 42% w/w sodium silicate solution (water glass), filler (34 to 36% w/w marble powder), 2% w/w sodium sulfide and the rest is talc. This adhesive composition adheres wide range of materials such as metal, wood, tiles, silica glass, linoleum, etc.

This adhesive composition has several considerable drawbacks:

poor water resistance because of water soluble compounds formed during solidification of sodium silicate solution;

low stability of viscosity and adhesive properties when the composition stored. The reason is adhesive composition contains sodium sulfide, which initiates crystallization process under prolonged storage at varying temperature. Crystallization increases composition viscosity, moreover composition segregates to liquid (water glass) and solid (marble powder) phases. This infringes the reproducibility of adhesive layer strength.

SU 251737, Sep. 10, 1969 discloses the adhesive composition comprising (in percent by weight) from 2.5 to 3.0 silicate glue, from 90 to 92 carbamide-phurphurol-formaldehyde resin, from 1 to 1.5 carboxymethylcellulose, 3.0 to 3.5 dextrim. The composition has good adhesive properties. It stays active for 2 to 3 days and dries within 8 to 10 minutes. However due to short activity and drying time this adhesive composition has only limited applications, for fixing labels on polyethylene packages mainly.

SU 1092939, Oct. 20, 1995 reports of adhesive composition for adhering metal, ceramic, glass and electrotechnical steel. It comprises (in percent by weight) from 19 to 28 sodium silicate, 10 to 14 aluminium hydroxide, 7 to 12 sodium hydroxide, 25 to 29 kaolin, 2 to 5 titanium dioxide, 1 to 3 kizelgur, 18 to 27 water. This adhesive composition has enhanced thermostability and efficiency at high temperature although it solidifies at temperature from 250 to 300° C., which restricts its household applications.

RU 2124033, Dec. 27, 1998 discloses adhesive mastic comprising water glass (sodium silicate) with the density of 1.38 to 1.41 kg/dm$^3$ and ratio SiO$_2$/Na$_2$O of 2.85 to 3.15, filled by quartz powder with particle size of 0.1 to 0.15 $\mu$m, talc with particle size of 5 to 20 $\mu$m and linking agent (phurphurol).

This adhesive composition has several considerable drawbacks:

low adhesion strength (about 0.5 to 0.6 MPa);

components toxicity, namely quartz powder particles of the size 0.1 to 0.15 $\mu$m irritate mucous membranes of respiratory tract and penetrating blood vessels are practically irremovable from living body. Phurphurol (aromatic aldehyde) irritates skin (permissible concentration in air is 0.05 mg/m$^3$, in water—1 mg/l);

low stability when stored: phurphurol causes solidification, which leads to increase of adhesive paste viscosity and change of its adhesive properties. Moreover poor tixotropic properties of sodium water glass cause sedimentation of solid phase (quartz powder, talc), which leads to mastic segregation. It forces the user to keep components in at least two separate packages. It is inconvenient in practice because the user has to mix components in exact proportions following mixing rules;

poor water resistance due to low stability and solubility of solidified sodium silicate in water.

The closest in details to the claimed invention is the adhesive composition (EP 0 041212, Dec. 09, 1981) comprising sodium silicate aqueous solution with weight ratio SiO$_2$/Na$_2$O 2.6–3.9:1 and/or potassium silicate aqueous solution with weight ratio SiO$_2$/K$_2$O 2–2.6:1 and also 25 to 50% w/w finely dispersed (from 1 to 45 $\mu$m) crystallic calcium carbonate originated from metamorphic calcite, 2 to 10% w/w quartz powder with the particle size up to 15 $\mu$m and developed specific surface area at least 3.5 m$^2$/g. This composition contains up to 24% w/w of stable aqueous organic polymer dispersion (50% of polymer) such as: acrylate, styrolacrylate, and/or styrolbutadiene. Up to 2% w/w lithium hydroxide is added to this adhesive composition in order to improve water resistance.

This adhesive composition mainly used in industry for adhering mineral fiber tiles has several considerable drawbacks:

low adhesion strength (about 0.5 to 0.6 MPa);

poor activity and properties stability under storage. Calcium carbonate is highly reactive in aqueous solutions of sodium and/or potassium silicates, which leads to thickening and following solidification of adhesive composition. All above upsets stability of viscosity and adhesive properties in a short time after composition preparation and thus complicates its use when stored for a long time;

adhesive composition components toxicity. It is caused by the fact that polymer latexes (acrylic, styrolic, styrolacrylic, butadienic) contain residues of monomers (1 to 2%) and synthetic catalysts (0.1%), and also stabilizers (0.5%) and organic solvents (2 to 5%);

poor thermostability. This is caused by thermal decomposition of calcium carbonate into calcium oxide and carbon dioxide at 300–400° C., which leads to adhesion junction breakdown.

Thus proceeding from the prior art, existing adhesive compositions lack the desirable characteristics allowing their use in industry and household. These characteristics include: enhanced storage stability, low toxicity, high adhesion strength, ability to solidify under ambient conditions, possibility to use them for wide range of materials, while keeping high water resistance of adhesive junction.

SUMMARY OF THE INVENTION

Accordingly, the object of the present invention is to provide water glass-based adhesive composition having enhanced adhesion strength;

prolonged activity and storage stability;

pollution-free use;

improved thermostability;

pollution-free adhesive composition fabrication process; with high water resistance of adhesion junction.

DETAILED DESCRIPTION

The combination of these properties allows widen the assortment of the materials to be adhered.

This goal is achieved owing to the fact that claimed adhesive composition includes the product of interaction between potassium silicate aqueous solution (potassium water glass) and anhydrous lithium hydroxide mixed with di- or trihydric alcohol or their mixture, vollastonite (also known as volastonite) talc and inorganic pigment. The density of initial potassium silicate solution is 1.30 to 1.37 g/cm³, its molar ratio $SiO_2/K_2O$ is 3.4–3.7. Initial vollastonite has particle size not more than 150 μm and length to diameter ratio 5–3:1. Component ratio (In percent by weight) is the following:

| | |
|---|---|
| Vollastonite- | 38.0–45.0 |
| Talc- | 8.0–12.0 |
| Anhydrous lithium hydroxide- | 1.0–1.5 |
| Di- or trihydric alcohol or their mixture- | 3.0–5.0 |
| Inorganic pigment- | 3.0–5.0 |
| Potassium silicate aqueous solution- | the rest |

Talc added has particle size preferably 10 to 20 μm

Ethyleneglycol and diethyleneglycol are recommended dihydric alcohols; as for trihydric alcohols, glycerol is preferable.

As for inorganic pigment, it can be titanium dioxide ($TiO_2$), chromium trioxide ($Cr_2O_3$) or iron oxides.

Recommended values of molar ratio $SiO_2/K_2O$ of potassium silicate aqueous solution are in the range of 3.4 to 3.7 because for ratios below 3.4 adhesion junction loses water resistance. For modulus above 3.7 rate of interaction between anhydrous lithium hydroxide and potassium silicate solution becomes very low (process time rises up to dozens of hours) which is technologically unacceptable. The products of the reaction inhibit lithium hydroxide particles activity and slow down the interaction.

For potassium silicate aqueous solution density range of 1.30 to 1.37 g/cm³ is recommended because using solutions with the density lower than 1.30 g/cm³ adhesion strength decreases. When potassium silicate solution with the density higher than 1.37 g/cm³ is used the viscosity of adhesive composition rises substantially making its application inconvenient.

Anhydrous lithium hydroxide (LiOH) prevents potassium silicate aqueous solution from gelation and coagulation thus substantially stabilizing adhesive composition when stored under temperature variations. That is probably related to the lithium cathion $Li^+$ behavior in aqueous media. Due to polarization lithium ion is highly hydrated and binds strongly the second hydration shell besides first coordination sphere consisting of four water molecules. Therefore hydrodynamic radius of lithium ion in aqueous systems is the highest in comparison with ions of other alkali metals. Correspondingly, the transition from hydrated lithium ions in solution to bounds Li—O—Si in crystal is hampered which increases system stability.

The addition of LiOH dissociating to cathions $Li^+$ and hydroxide ions $OH^-$ in aqueous media shifts the equilibrium between polymeric anions towards formation of stable forms of low-polymeric silicic acids:

$$\equiv Si\text{—}O\text{—}Si\equiv +OH^- \rightarrow \equiv SiOH + \equiv SiO^-.$$

Lithium hydroxide improves water resistance of dried adhesion junction besides stabilizing action. The Li—O—Si bond is chemically strong and this compound does not dissociate in water thus making adhesive layer water-insoluble. These bounds formation is promoted by water lose during drying. Gradual carbonization, i.e. interaction with atmospheric $CO_2$ and formation of insoluble lithium carbonate ($Li_2CO_3$) also improves water resistance of solidified adhesion junction.

Recommended di- or trihydric alcohols or their mixture (e.g. ethyleneglycol, glycerol) improve plasticity and therefore increase crack resistance (after its solidification). Besides those components slow down water evaporation from adhesive composition and its drying while stored under temperature variations, which increases its activity and storage stability furthermore.

Di- and trihydric alcohols aqueous solutions are known to have low freezing point (down to −40° C.). For instance, 20% glycerol aqueous solution freezes at the temperature below −5° C. Adhesive composition claimed has approximately the same glycerol to water ratio. However adhesive composition doesn't freeze even at −20° C. Apparently its freezing point decreases considerably because of unknown influence of other components.

Composition stability in the presence of above-mentioned alcohols is also not so easy to explain. Sodium and potassium water glasses are known to be incompatible with a wide range of organic compounds including mono- and polyatomic alcohols. Usually they cause the whole composition coagulation. Supposedly adhesive composition is stabilized by the presence of lithium cathions.

Vollastonite used for this composition production is white needle-shaped particles. This is a mineral from chain silicates subclass with the density of 2.9 to 3.1 g/Cm³ and general formulae $Ca_3[Si_3O_9]$. Recommended particle size is 150 μm or smaller and length to diameter ratio (L/D) is 5–3:1. Vollastonite decomposition temperature is about 1405° C. Vollastonite with the recommended parameters provides optimal adhesive composition properties (plasticity, crack resistance). Higher L/D ratios worsen adhesive composition properties since particles and vollastonite fibers elongation deteriorates reological properties, i.e. paste becomes more viscous. Decrease of L/D ratio increases total vollastonite surface to be moistened by the product of interaction between potassium silicate aqueous solution with anhydrous lithium hydroxide.

Vollastonite has a reduced reactivity to water glass. This means that composition containing vollastonite will keep the initial consistence during rather long period of time. On the other hand, vollastonite partially dissociate with the formation of $Ca^{2+}$ and $Si(OH)_n O_{4-n}^{(4-\bar{n})-}$ (n<=4) ions in water glass media thus providing gradual transition of binder into water insoluble state during adhesive composition drying. The end products of this reaction are likely calcium hydrosilicates forming gel of tobermorite-like structure.

Talc used for this composition production has particle size preferably 10 to 20 μm (white particles of magnesium hydrosilicate minerals $3MgO.4SiO_2.H_2O$ with the density of 2.79 g/cm³.

Since adhesive composition preparation technology requires simultaneous addition of talc and vollastonite portions, vollastonite and talc added in mentioned quantity and proportion swell in the product of interaction between potassium silicate aqueous solution and anhydrous lithium hydroxide. This results in enhancing adhesive composition characteristics namely thickness needed, plasticity and it doesn't shrink during solidification, doesn't crack and has smooth surface.

Specific fiber-like, elongated (needle-like) vollastonite particle shape with L/D ratio of 5–3:1 and small-scaly layered talc crystals build up conglomerate with high cohesive strength.

As pigments inactive inorganic pigments are recommended, such as titanium dioxide ($TiO_2$), white particles of routhil pigment with the density of 4.05 g/cm³. Titanium dioxide gives the composition white color. Its use in the quantity of 3.0 to 5.0% w/w provides adhesive composition with the possibility to regulate its thixotropic properties, i.e. the possibility to vary composition structure under deformation reversively. In order to change composition color, chromium trioxide ($Cr_2O_3$) or iron oxides can be used.

Comparative analysis of claimed adhesive composition with the closest analogue shows the following specific signs:

use of vollastonite with particle size 150 μm or smaller and with the L/D ratio 5–3:1;

use of potassium silicate aqueous solution with specific density in a range from 1.30 to 1.37 g/cm³ and molar ratio $SiO_2/K_2O$ of 3.4 to 3.7;

use of dihydric alcohol chosen from ethyleneglycol or diethyleneglycol and trihydric alcohol, glycerol, or their mixture;

The main operations of the production of adhesive composition, representing a complex product of interaction between potassium silicate aqueous solution and anhydrous lithium hydroxide with the mixture of its components, are as follows.

The initial stage includes portional adding of anhydrous lithium hydroxide into potassium silicate aqueous solution. Each portion is being mixed until complete dissolution (disappearing) of lithium hydroxide particles. Second stage is portional adding di- or trihydric alcohol (e.g. ethyleneglycol, diethyleneglycol) or their mixture into the first stage interaction product. Then follows the consecutive portional adding of vollastonite and talc into mixture and mixing until getting a homogenous product. Final stage includes adding inorganic pigment.

Adhesive composition is being stored in hermetic packages.

The adhesive composition allows increase considerably the range of materials to be adhered: concrete, ceramics, wood (oak, beech, softwood), marble, steel, glass and their various combinations, forming a strong and water resistant adhesion junction.

Best Realizations.

EXAMPLE 1

For 1 kg adhesive composition preparation under room temperature, blade mixer is loaded with 378 g potassium silicate aqueous solution with the density of 1.32 g/cm³ and molar ratio $SiO_2/K_2O$ of 3.6. Under blades rotating, 12 g anhydrous lithium hydroxide is added in portions of 3 to 4 g. Each lithium hydroxide portion is being mixed until its complete dissolution. Then, under blades rotating, 40 g glycerol is added in portions of 10 g. Then 44 g vollastonite with particle size of 90 μm and L/D ratio of 3:1 and 9 g talc with particle size of 10 to 20 μm are mixed until getting a homogenous product. 440 g vollastonite and 90 g talc are added this way. The final stage includes adding 40 g titanium dioxide and mixing within 30 minutes. Ready-made adhesive composition, a white viscous mass, is bottled and being stored in hermetic packages.

While using adhesive composition, it is put on concrete, plastered or other surface in a thin layer (1 to 3 mm) and after that, coating tile or other material is slightly pressed to adhesive composition layer.

Industrial Usage

Claimed adhesive composition allows adhere coating materials and articles such as ceramic and natural stone tiles, parquet, pendant ceilings to concrete and plastered wall, ceiling and floor surfaces for inner and outer finishing of residential or public buildings. The buildings are exploited under temperatures from +50 to −20° C. and under high humidity.

The components of adhesive composition are well-known and used commercially. Its preparation technology needs standard equipment for grout production.

The advantages of claimed adhesive composition are as follows:

enhanced water resistance of adhesion junction;

high strength of adhesion junction;

enhanced activity and storage stability;

production process being pollution-free and components being non-toxic;

wide range of materials to be adhered.

TABLE

Composition of invented adhesive and its properties

| | Initial components % w/w | | | | | | | | | |
|---|---|---|---|---|---|---|---|---|---|---|
| | Vollastonite with particle size of 150 μm and smaller L/D | Talc with particle size mainly 10 to 20 μm | Titanium dioxide ($TiO_2$) | Chromium Trioxide ($Cr_2O_3$) | Anhydrous lithium hydroxide | Glycerol | Diethylene glycol | Potassium silicate aqueous solution | | |
| Example # | | | | | | | | mass % | Density g/cm³ | Molar ratio $SiO_2/K_2O$ |
| 1 | 44.0 3:1 | 9.0 | 4.0 | — | 1.2 | 4.0 | — | 37.8 | 1.32 | 3.6 |
| 2 | 45.0 3:1 | 8.0 | — | 5.0 | 1.0 | 5.0 | — | 36.0 | 1.30 | 3.4 |
| 3 | 40.0 5:1 | 12.0 | 3.0 | — | 1.5 | — | 3.0 | 40.5 | 1.37 | 3.7 |
| 4 | 38.0 5:1 | 9.0 | — | 3.0 | 1.2 | 2.0 | 2.0 | 44.8 | 1.32 | 3.7 |
| 5 | 42.0 5:1 | 11.0 | 5.0 | — | 1.3 | 4.5 | — | 36.2 | 1.35 | 3.5 |

| | Properties | | | | | |
|---|---|---|---|---|---|---|
| | Water resistance (solubility in water, mass %) | | *Adhesion junction strength, MPa concrete adhered to: | | | |
| Example # | 1 hour boiling, 100° C. | Cold, running, 5 hours | Ceramics | Wood (beech) | Marble | Steel | Glass |
| 1 | 1.5 | 0.20 | 1.25 | 0.85 | 1.25 | 0.80 | 0.75 |
| 2 | 1.4 | 0.18 | 1.20 | 0.80 | 1.10 | 0.75 | 0.70 |

TABLE-continued

Composition of invented adhesive and its properties

| 3 | 1.6 | 0.25 | 1.30 | 0.87 | 1.32 | 0.85 | 0.80 |
| 4 | 1.5 | 0.20 | 1.25 | 0.85 | 1.25 | 0.80 | 0.75 |
| 5 | 1.4 | 0.18 | 1.20 | 0.80 | 1.10 | 0.75 | 0.70 |
| Protoype | 2.6 | 0.45 | 0.54 | 0.42 | 0.59 | 0.34 | 0.50 |

*Strength is determined by tearing off adhered material from concrete surface after 7 days storage under room temperature.

What is claimed is:

1. An adhesive composition including a product of interaction between silicate aqueous solution (water glass) and anhydrous lithium hydroxide mixed with di- or trihydric alcohol or their mixture, vollastonite, talc and inorganic pigment, wherein the silicate aqueous solution initially has a density of about 1.30 to 1.37 g/cm$^3$ with a $SiO_2/K_2O$ molar ratio of about 3.4–3.7, wherein said vollastoriite initially has a particle size not more than about 150 mm and a length to diameter ratio of about 5–3:1, and wherein the composition has a component ratio (in percent by weight) as follows:

| a) Vollastonite | about 38.0–45.0 |
| b) Talc | about 8.0–12.0 |
| c) Anhydrous lithium hydroxide | about 1.0–1.5 |
| d) Di- or trihydric alcohol or their mixture | about 3.0–5.0 |
| e) Inorganic pigment | about 3.0–5.0 |
| f) Potassium silicate aqueous solution selected from the group consisting of sodium water glass and potassium water glass | balance. |

2. The composition of claim 1 wherein the talc has a particle size of about 10 to 20 mm.

3. The composition of claim 1 including a dihydric alcohol selected from the group consisting of ethyleneglycol, diethyleneglycol, and a mixture thereof.

4. The composition of claim 1 including glycerol as a trihydric alcohol.

5. The composition of claim 1 including titanium dioxide ($TiO_2$), chromium trioxide ($Cr_2O_3$) or iron oxides as inorganic pigments.

6. The composition of claim 1 wherein the silicate aqueous solution is sodium water glass.

7. The composition of claim 1 wherein the silicate aqueous solution is potassium water glass.

* * * * *